United States Patent
Kahn et al.

(10) Patent No.: US 8,187,100 B1
(45) Date of Patent: May 29, 2012

(54) SHARED EXECUTION OF HYBRID STATES

(75) Inventors: Philippe Kahn, Aptos, CA (US);
Arthur Kinsolving, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 1121 days.

(21) Appl. No.: 12/074,439

(22) Filed: Mar. 3, 2008

Related U.S. Application Data

(60) Provisional application No. 60/892,818, filed on Mar. 2, 2007.

(51) Int. Cl.
*A63F 9/24* (2006.01)
(52) U.S. Cl. ............................. 463/42; 705/59
(58) Field of Classification Search .................... 463/42; 705/59
See application file for complete search history.

(56) References Cited

U.S. PATENT DOCUMENTS

| | | | | |
|---|---|---|---|---|
| 7,921,059 | B2 * | 4/2011 | Chicks et al. | 705/59 |
| 2008/0010539 | A1 * | 1/2008 | Roth | 714/38 |
| 2009/0138654 | A1 * | 5/2009 | Sutardja | 711/103 |
| 2011/0040568 | A1 * | 2/2011 | Dutton et al. | 705/1.1 |

OTHER PUBLICATIONS

MacGregor, Ken, et al., "MuttZ: An Interactive Cellphone Game" Technical Report CS04-26-00, Department of Computer Science, University of Cape Town, 6 pages, Oct. 21, 2004.

\* cited by examiner

*Primary Examiner* — Pierre E Elisca
(74) *Attorney, Agent, or Firm* — Blakely, Sokoloff, Taylor & Zafman LLP; Judith A. Szepesi

(57) ABSTRACT

An application is executed in a first state on a handheld device. The first state is combined with a second state being executed on an additional device to generate a hybrid state, execution of the hybrid state being shared between the handheld device and the additional device. A first aspect of the hybrid state is displayed on the handheld device.

22 Claims, 10 Drawing Sheets

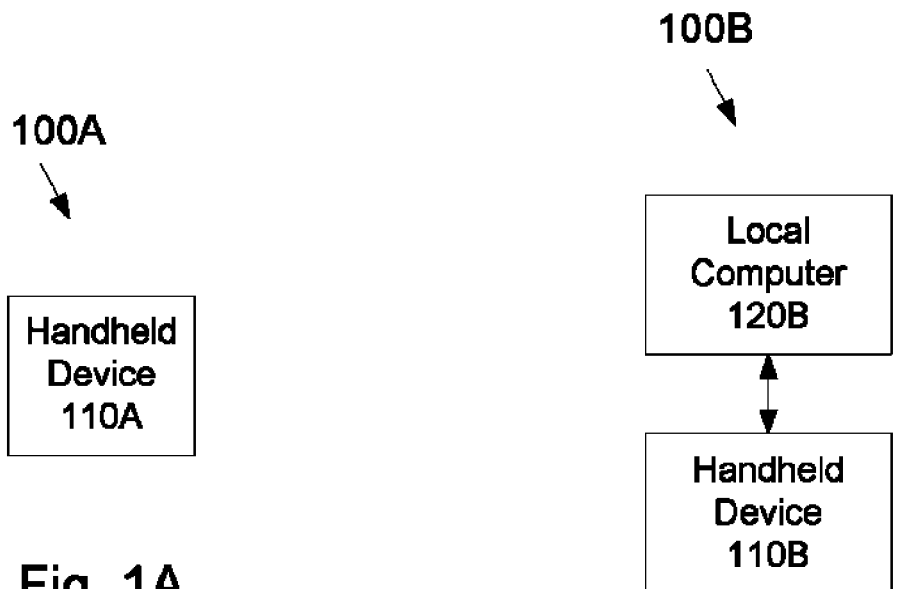
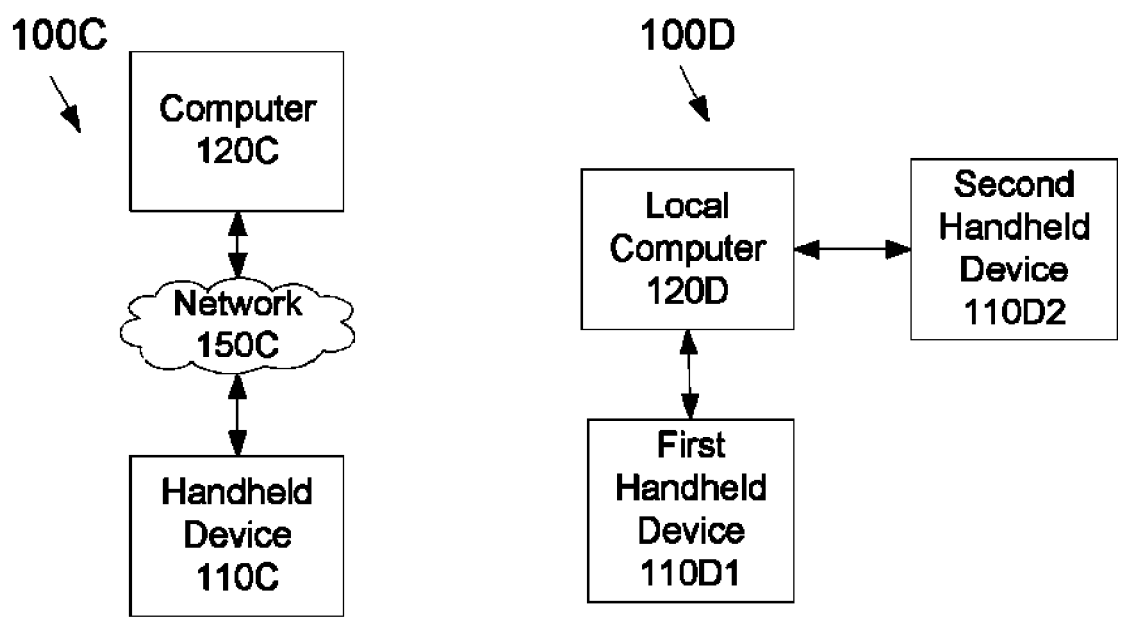
Fig. 1A
Fig. 1B
Fig. 1C
Fig. 1D

SHARED EXECUTION OF HYBRID STATES

RELATED APPLICATIONS

This patent application claims the benefit under 35 U.S.C. §119(e) of U.S. provisional application No. 60/892,818, filed Mar. 2, 2007, which is herein incorporated by reference.

FIELD OF THE INVENTION

This invention relates to shared computing systems, and more specifically to shared execution of hybrid states between a handheld device and one or more other devices.

BACKGROUND

Handheld computing devices are used for a plethora of applications, such as to communicate, to keep schedules, to play games, to surf the internet, to listen to music, etc. Many handheld devices (e.g., cell phones, personal digital assistants (PDAs), mp3 players) have the ability to connect to a network and/or to connect directly to other devices.

BRIEF DESCRIPTION OF THE DRAWINGS

The present invention is illustrated by way of example, and not by way of limitation, and can be more fully understood with reference to the following detailed description when considered in connection with the following figures:

FIG. 1A shows a block diagram of a system on which an application is run in a first state, in accordance with one embodiment of the present invention;

FIG. 1B shows a block diagram of a system on which an application is run in a hybrid state, in accordance with one embodiment of the present invention;

FIG. 1C shows a block diagram of another system on which an application is run in a hybrid state, in accordance with one embodiment of the present invention;

FIG. 1D shows a block diagram of another system on which an application is run in a hybrid state, in accordance with one embodiment of the present invention;

DETAILED DESCRIPTION

Figure 1E:
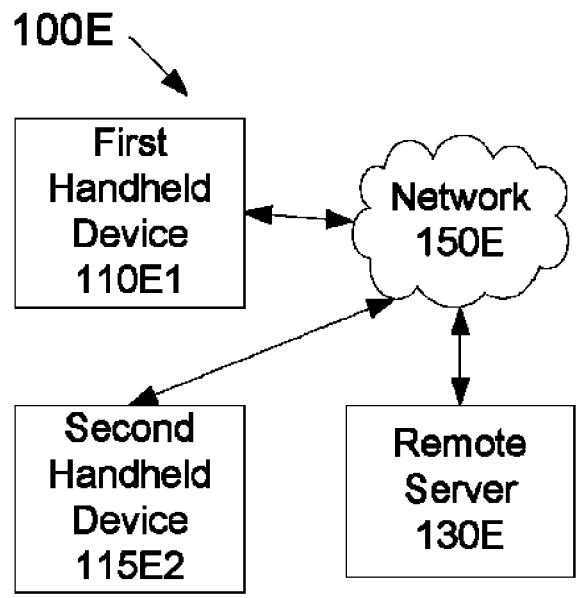
FIG. 1E shows a block diagram of another system on which an application is run in a hybrid state, in accordance with one embodiment of the present invention.

Embodiments of the present invention are designed to execute applications on a handheld device in specific states and specific modes, the state and the mode depending on connectivity with additional devices. The term "state," refers to a status of the application. For example, in a game, the state refers to the level a player has achieved, where in a game she is, what equipment she has, how much health she has, etc. The term "mode," on the other hand, refers to whether the device is running the application by itself, or whether it is splitting responsibility for running the application with one or more other devices. In one embodiment, an application is executed on a handheld device and the device maintains a current state, referred to as a first state. The first state may include, for example, details on application contents, user progress within the application, save file information, etc. When the device is coupled to another device, the first state is combined with a second state being executed on the other device to generate a hybrid state. In one embodiment, execution of the hybrid state is shared between the handheld device and the additional device. In one embodiment, the display may also be split between the handheld device and the additional device. A first aspect of the hybrid state may then be displayed on the handheld device. In one embodiment, an application is run on the handheld device in one of three modes: a solo mode, a peer-to-peer mode, and a client mode.

FIGS. 1A-1G illustrate block diagrams of systems having connected components (e.g., handheld devices, servers, computers, etc.), in accordance with embodiments of the present invention. The handheld device may be any mobile computing device capable of establishing a connection (wireless or wired) to other devices. Examples of handheld devices include, cellular phones, mp3 players, PDAs, mobile game consoles, laptop computers, and so on. The servers and computers may be console game machines (e.g., Sony PlayStation®, Nintendo Wii®, Microsoft Xbox®, etc.), personal computers (desktop or laptop), network servers, game kiosks, etc. Connections may be established directly between devices, or over a public network (e.g., internet) or private network (e.g., local area network (LAN), intranet, etc.). Wireless connections may be established using any wireless data transfer protocol, such as Bluetooth, radiofrequency (RF), wireless local area network (WLAN), infrared, global system for mobile communications (GSM), code division multiple access (CDMA), integrated digital enhanced network (iDEN), etc. Wired connections may be established using firewire, Ethernet, universal serial bus (USB), etc.

FIGS. 1A-1G show systems having specific components (e.g., handheld devices, computers, severs, etc.) in accordance with embodiments of the present invention. However, other systems than those illustrated may also be used. In one embodiment, there is no upper limit on the number of handheld devices, servers, computers, etc. that can be connected together. In other embodiments, upper limits on the number of components may be set by an application being run on one or more of those components. For example, a particular game may not accept more than 15 players. Alternatively, operators (e.g., system administrators) of one or more of the components (e.g., of a server or game kiosk) may designate an upper limit on the number of components.

FIG. 1A shows a block diagram of a system 100A on which an application is run in a first state, in accordance with one embodiment of the present invention. The system 100A includes a handheld device 110A. Handheld device 110A is not connected to a computer, server, handheld device, or any other computing device. Thus, the handheld device 110A is operating in solo mode. The first state may include details of the application contents, user progress within the application, application save file information, user preferences, and so on. Information about the first state may or may not be displayed on a display of the handheld device 110A. In one embodiment, the application is a game. Alternatively, the application may be a media player, a spreadsheet, an internet browser, etc.

In one embodiment, the handheld device 110A is a portable electronic device that includes one or more inertial sensors. The inertial sensors may measure linear as well as rotational (angular) accelerations, along a single axis or multiple axes. The inertial sensors may be used to detect user inputs to control features of the application being run on the handheld device 110A. For example, the inertial sensors may measure user movement, and translate this into a pointer position on a display of the handheld device 110A. If the application is a game, for example, the inertial sensors may be used to determine character movement, position, and actions within the game. Alternative methods of controlling the pointer position and making selections may be used.

FIG. 1B shows a block diagram of a system 100B on which an application is run in a hybrid state, in accordance with one embodiment of the present invention. The system 100B includes a handheld device 110B connected directly to a local computer 120B. The local computer 120B may be a game console (e.g., PlayStation), a personal computer, etc. The local computer 120B and the handheld device 110B may each run the same application in the hybrid state. The hybrid state combines a first state of the application run on the handheld device 110B with a second state of the application run on the local computer 120B.

Execution of the hybrid state may be shared between the handheld device 110B and the local computer 120B, either evenly or unevenly. In one embodiment, instructions for the hybrid state are divided into a first portion and a second portion. The first portion of the instructions may be executed by the local computer 120B and the second portion of the instructions may be executed by the handheld device 110B. The handheld device 110B and the local computer 120B may then exchange results generated by executing the first portion and the second portion. Alternatively, each of the handheld device 110B and the local computer 120B may execute the same set of instructions (though possibly with different inputs) in parallel.

In one embodiment, a distribution of the share of processing performed by the local computer 120B and the handheld device 110B is made based on processing power. Therefore, a greater share of executing the application may be performed by the device having the greater processing power. This may provide efficient execution of applications.

In one embodiment, the distribution of the share of processing is determined when the hybrid state is generated. Thereafter, the distribution of the share of processing may change as additional devices are connected and/or disconnected from the local computer 120B and/or handheld device 110B. In one embodiment, the distribution of the share of processing is dynamic. Moreover, the instruction sets and or types of instruction sets that each device executes for the hybrid state may be dynamic. For example, the handheld device 110B may be responsible only for receiving game inputs and forwarding them to the local computer 120B. Alternatively, the handheld device 110B may be responsible for receiving game inputs and 10% of general processing tasks of the hybrid state. Therefore, when the handheld device 110B becomes connected with another device (e.g., a local computer 120B that has greater processing power), game performance may be improved (e.g., frames per second, amount of lag, etc.). This may be because the total processing power of the system (including the local computer 120B and the handheld device 110B) has increased.

Handheld device 110B may have a display, on which first aspects of the hybrid state may be presented. The local computer 120B may or may not have a local display. Where the local computer 120B has a local display, second aspects of the hybrid state may be presented on the local display. For example, if the application is a first person shooter game, a display on the handheld may show weapons, ammunition, health, etc. for a character controlled by the handheld device 110B, and the display on the local computer 120B may show a first person perspective view of the game from the perspective of the character controlled by the handheld device 110B.

FIG. 1C shows a block diagram of a system 100C on which an application is run in a hybrid state, in accordance with one embodiment of the present invention. The system 100C includes a handheld device 110C connected to a computer 120C through a network 150C. The local computer 120C and the handheld device 110C may share execution of an application in a hybrid state.

In one embodiment, the computer 120C is a local computer. Alternatively, the computer may be a remote computer, physically separated from the handheld device 110C. In one embodiment, the computer 120C and the handheld device 110C must maintain a certain proximity to one another to maintain the connection via the network. Alternatively, the proximity between the local computer 120C and the handheld device 110C is not determinative of connectivity. For example, if the local computer 120C and the handheld device 110C are connected over a public network (e.g., the internet), then a connection may be maintained so long as both devices are connected to the network 150C. Where the handheld device 110C is not in proximity to the computer 120C, no aspects of the hybrid state may be shown on a display of the computer 120C.

FIG. 1D shows a block diagram of a system 100D on which an application is run in a hybrid state, in accordance with one embodiment of the present invention. The system 100D includes a first handheld device 110D1 and a second handheld device 110D2 connected directly to a local computer 120D. In one embodiment, the handheld devices 110D1 and 110D2 must maintain a certain proximity to local computer 120D to maintain a connection to it. The connection may be wired or wireless. The local computer 120D and the handheld devices 110D1 and 110D2 may share execution of an application in a hybrid state. The hybrid state may be divided into three sets of instructions. Each of the local computer 120D, first handheld device 110D1 and second handheld device 110D2 may execute one of the three sets of instructions. Each of the sets of instructions may include instructions that are included in the other sets of instructions and/or instructions that are not included in the other sets of instructions. First aspects of the hybrid state may be shown on a display of the first handheld device 110D1, second aspects of the hybrid state may be shown on the second handheld device 110D2, and third aspects of the hybrid state may be shown on a display of the local computer 120D. For example, to continue the earlier example of a first person shooter game, in this embodiment, the first handheld device 110D1 may show the game in a first person perspective from the point of view of a character controlled by the first handheld device 110D1, the second handheld device 110D2 may show the game in a first person perspective from the point of view of a character controlled by the second handheld device 110D2, and a display of the local computer 120D may show an overhead view indicating the locations of both characters as well as other non-player characters.

In one embodiment, the physical distance between the first handheld device 110D1 and the second handheld device 110D2 is used as an application parameter or input. In one embodiment, a change in relative distance between the first handheld device and second handheld device is used as an application input or parameter. Relative distance between the handheld devices and the local computer 120D may also be used as an application input or parameter. The relative distance between handheld devices (and the local computer 120D) may be determined, for example, by sending data packets back and forth between devices, and timing the transfer. Distance between devices may be used, for example, in a racing game to determine whether players collide with one another.

FIG. 1E shows a block diagram of a system 100E on which an application is run in a hybrid state, in accordance with one embodiment of the present invention. The system 100E includes a first handheld device 110E1 and a second handheld device 110E2 connected to a remote server 130E over a network 150E. The remote server 130E and the handheld devices 110E1 and 110E2 may share execution of an application in a hybrid state. First aspects of the hybrid state may be shown on a display of the first handheld device 110E1, and second aspects of the hybrid state may be shown on a display of the second handheld device 110E2.

Figure 1F:
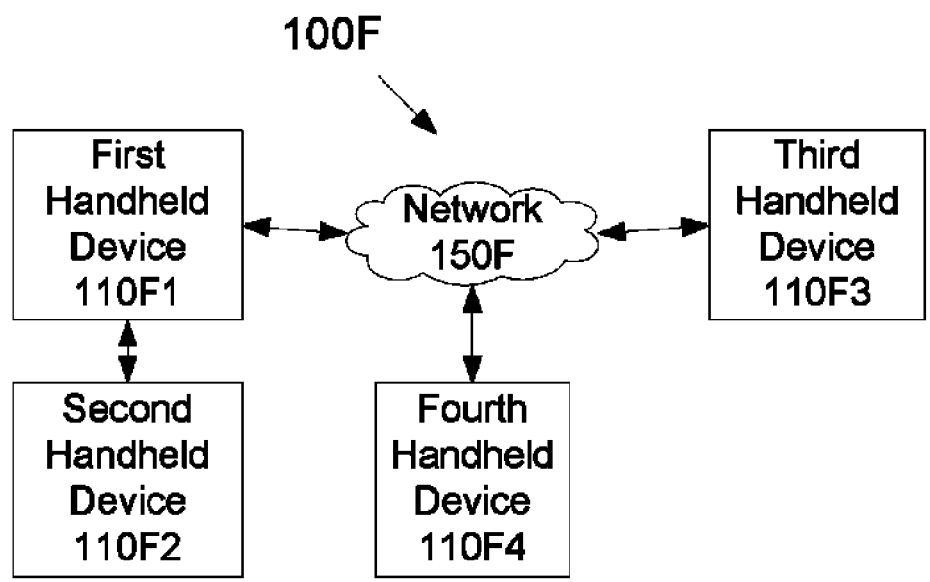
FIG. 1F shows a block diagram of another system on which an application is run in a hybrid state, in accordance with one embodiment of the present invention.

FIG. 1F shows a block diagram of a system 100F on which an application is run in a hybrid state, in accordance with one embodiment of the present invention. The system 100F includes multiple handheld devices connected together and running the common application. A first handheld device 110F1 is connected directly to a second handheld device 110F2. The first handheld device is also connected to a third handheld device 110F3 and a fourth handheld device 110F4 over a network 150F. Each of the handheld devices may exchanges messages (e.g., data packets) pertaining to the hybrid state. In one embodiment, first handheld device 110F forwards messages from second handheld device 110F2 to third handheld device 110F3 and fourth handheld device 110F4, and forwards messages from third handheld device 110F3 and fourth handheld device 110F4 to second handheld device 110F2. In one embodiment, the handheld devices may share execution of the application in a hybrid state. In one embodiment, execution may be shared unequally between the handheld devices. Therefore, the processing load is distributed between the handheld devices. Different aspects of the hybrid state may be displayed on each of the handheld devices.

Figure 1G:
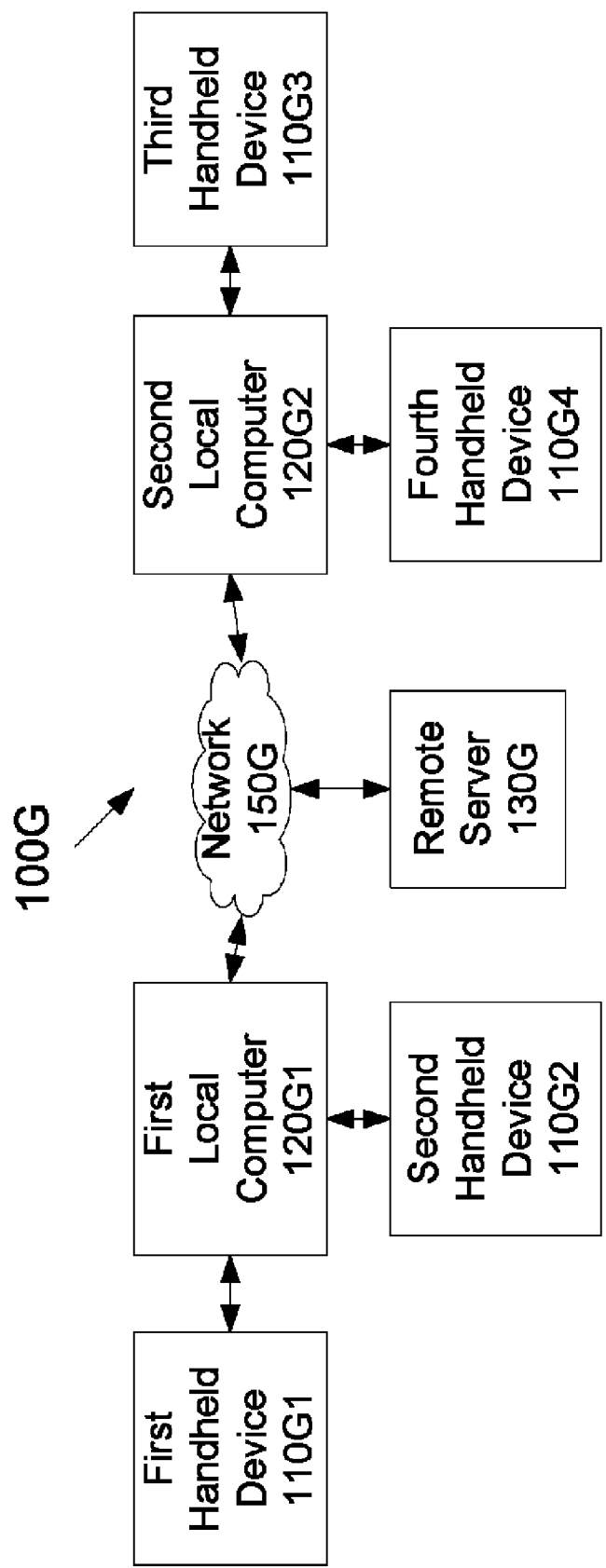
FIG. 1G shows a block diagram of another system on which an application is run in a hybrid state, in accordance with one embodiment of the present invention.

FIG. 1G shows a block diagram of a system 100G on which an application is run in a hybrid state, in accordance with one embodiment of the present invention. The system 100G includes a first local computer 120G1 and a second local computer 120G2 connected to a remote server 130G over a network 150G. The first local computer 120G1 is connected to a first handheld device 110G1 and a second handheld device 110G2. The second local computer 120G2 is connected to a third handheld device 110G3 and a fourth handheld device 110G4. Thereby, users of the first handheld device 110G1, second handheld device 110G2, third handheld device 110G3 and fourth handheld device 110G4 may interact with one another through the application being run in the hybrid state. Users of the handheld devices may also interact with users of the first local computer 120G1 and/or second local computer 120G2. The hybrid state may combine a first state of the first handheld device 110G1, a second state of the second handheld device, a third state of the third handheld device, the state of the first local computer 120G1, the state of the remote server 130G, etc. Thereby, work and progress done in a specific program state on any handheld device remote server and/or local computer may be incorporated into the hybrid state. Different aspects of the hybrid state may be displayed on each of the handheld devices.

Moreover, each of the first local computer 120G1 and second local computer 120G2 may display aspects of the hybrid state as well. For example, first local computer 120G1 may show aspects of the hybrid state pertaining to the first handheld device 110G1 and second handheld device 110G2, and second local computer 120G2 may show aspects of the hybrid state pertaining to the third handheld device 110G3 and fourth handheld device 110G4. This may be useful, for example, in multi-team games in which a first team competes against a second team. In a multi-team game, each handheld device may display information for a single player, while each local computer may display information for a particular team.

Figure 2A:
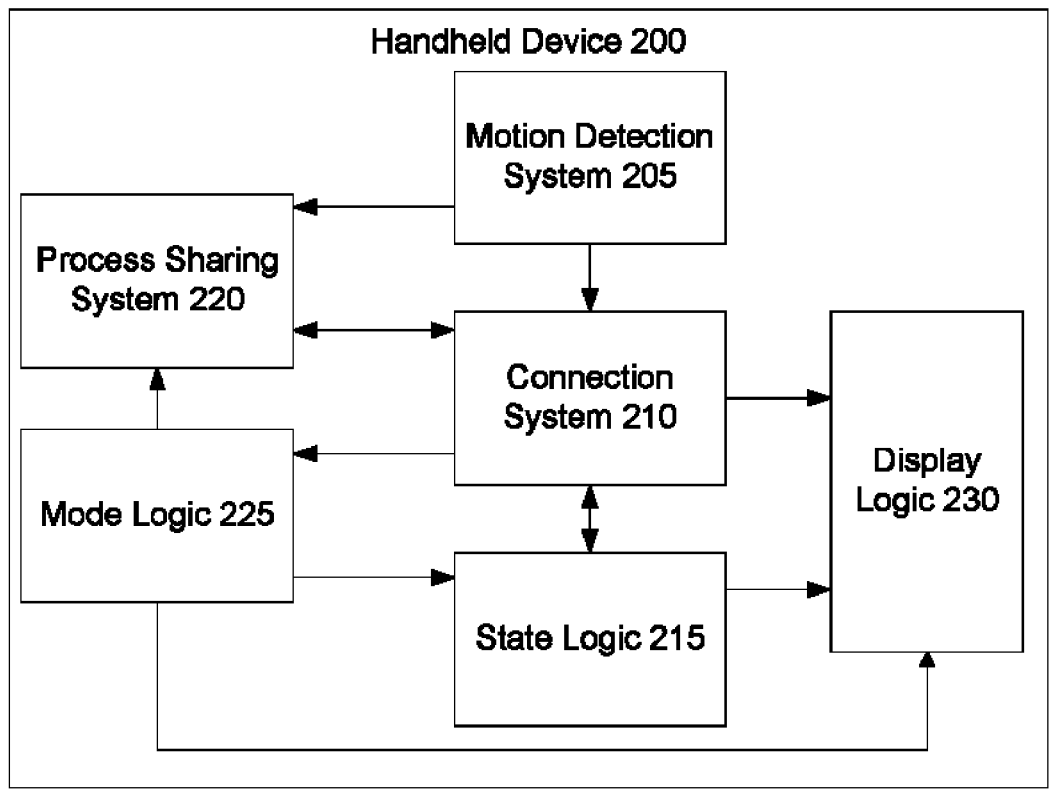
FIG. 2A illustrates a block diagram of a handheld device, in accordance with one embodiment of the present invention.

FIG. 2A illustrates a block diagram of a handheld device 200, in accordance with one embodiment of the present invention. The handheld device 200 may correspond to any of the handheld devices 110A-110G4 shown in FIGS. 1A-1G. In one embodiment, the handheld device 200 includes a motion detection system 205, a connection system 210, a state logic 215, a process sharing system 220, a mode logic 225, and a display logic 230. Each of these logics and systems may comprise hardware (e.g., circuitry, dedicated logic, programmable logic, microcode, etc.), software (such as instructions run on a processing device), or a combination thereof.

In one embodiment, the motion detection system 205 is used to detect motion of the handheld device 200, and to control an application executed on the handheld device 200. The motion detection system 205 may include an inertial sensor (not shown) that takes periodic measurements of accelerations. These measurements of accelerations may be used by the motion detection system 205 to determine user gestures, and to translate such gestures into inputs for the handheld device 200. For example, if the handheld device is executing a game, moving the handheld device to the left may move a character within the game to the left, moving the handheld device to the right may move the character to the right, etc. User input determined by the motion detection system 205 may be sent to the process sharing system 220 and to the connection system 210.

The connection system 210 manages connections to computing devices. The connection system 210 may manage connections to other handheld devices, to servers, to computers, etc. The connection system 210 may receive data from the process sharing system 220 and from the motion detection system 205, and send the data to connected computing devices. For example, motion data from the motion detection system 205 may be sent to a computer to control a character of a game being executed on the handheld device 200 and on the computer. Data may also be received from the connected computing devices, and forwarded to the process sharing system 220 and to the mode logic 225. In one embodiment, the handheld device 200 acts primarily or solely as a controller, while the actual computations take place on the computing device. In this embodiment, communication with the connected computing device may be primarily a one way communication, in which data from the motion detection system 205 is sent to the connected computing device. In one embodiment, the handheld device 200 may also provide additional display, in which case the communication with the connected computing device may be a two-way communication.

In one embodiment, the connection system 210 sends data packets (continuously or periodically) to each device to which the handheld device 200 is connected. The connection system 210 may receive reply packets for each of the data packets sent out. Based on the amount of time that it takes to receive each of the reply packets, the connection system 210 may determine a relative distance to each of the connected devices. This information may be used as an application parameter or input.

The mode logic 225 places the handheld device 200 in one of multiple modes, depending on data received from the connection system 210. In one embodiment, the mode logic 225 places the handheld device 200 in a solo mode when no data is received from the connection system (e.g., when the handheld device is not connected to any computing devices). While in solo mode, the handheld device 200 acts as an autonomous system, in which no input or data is exchanged with other devices. In one embodiment, the mode logic 225 places the handheld device 200 in a component mode when the connection system establishes a connection with one or more computing devices. While in component mode, the handheld device 200 is part of a system that comprises multiple computing devices, each of which may contribute to computing, displaying, modifying, etc., an application.

In one embodiment, the mode logic 225 identifies types of computing devices to which the connection system 210 has established a connection, and further distinguishes between different types of component modes. If all of the devices with which connections are established are handheld devices, the mode logic 225 may place the handheld device 200 in a peer-to-peer mode. If one or more of the connected devices is a computer (e.g., server, kiosk, console, personal computer), the mode logic 225 may place the handheld device 200 in a client mode. If the handheld device 200 is not connected to another device, it is in solo mode. In one embodiment, there may be multiple sub-modes of each of these modes, depending on the relative computing power and display abilities of the other devices. For example, in client mode, there may be a "local client mode" for situations in which at least part of the display for the application is on the server, and a "remote client mode" for situations in which the server does not provide display.

In one embodiment, the process sharing system 220 shares responsibility for running an application between the handheld device 200 and one or more connected computing devices. Whether and how the process sharing system 220 shares processing of an application may depend on the mode of the handheld device 200. When in solo mode, the process sharing system does not share any processing with another device. When in component mode, some or all of the processing may be shared with connected computing devices. The amount of processing assigned to the connected computing devices may depend on the relative processing power of the handheld device 200 and the connected computing devices, and on the type of component mode in which the handheld device 200 has been placed (e.g., peer-to-peer mode or client mode).

The state logic 215 determines a current program state for an application executed on the handheld device 200. The current state may change as connections are established and lost by the connection system 210. In one embodiment, the current state also continuously changes as the application is used. The state logic 215 determines a current application state based on the individual states of each of the connected devices. When the handheld device 200 is running in solo mode, it may have a first state. Upon connection to a computing device, state information may be received from that device by the connection system 210, forwarded to the state logic 215, and combined with the first state to generate a hybrid state. The hybrid state may incorporate elements of each of the previous states. Thereby, progress made in an application (e.g., a game) by each connected device may be preserved, and incorporated into the hybrid state. In a game, for example, such progress may include character development, story development, level advancement, etc. For example, when state logic 215 combines a first state and a second state to generate a hybrid state, character development included in each separate state may be included in the hybrid state, story development from each separate state may be merged, etc. Combining story development may include, for example, merging maps revealed in the separate states, advancing plot lines based on actions taken in each individual state, and so on.

When connections to additional devices are lost, state logic 215 may change the current state to a third state. The third state may include progress achieved by each device while the hybrid state was maintained. In one embodiment, the third state also includes progress that was achieved by the separate devices before the hybrid state was entered into (e.g., game development that occurred due to the actions of other game players while the other devices were in a solo mode).

Transition between states can occur smoothly without interrupting current actions being performed by connected devices. For example, in a game the transition may occur without interrupting game play.

The handheld device 200 may include a display logic 230 that determines what to display on the handheld device 200. The display logic 230 may determine what to display on the handheld device 200 based on a current mode as determined by the mode logic 225, on a current state determined by the state logic 215, and based on information from the connection system 210 detailing information on connected devices. For example, if the handheld device 200 is not connected to any devices, and is therefore in solo mode, an application may be displayed on the handheld device in a first manner. However, if the connection system 210 indicates that the handheld device 200 is connected to a computer that includes a local display, first aspects of the current state may be shown on the computer's display and second aspects may be shown on a display of the handheld device 200.

Figure 2B:
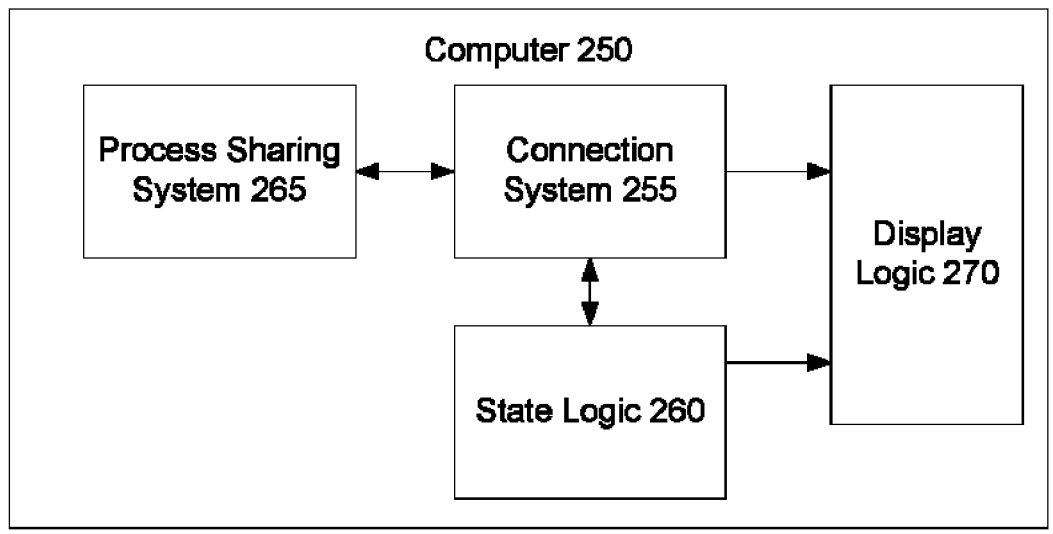
FIG. 2B illustrates a block diagram of a computer, in accordance with one embodiment of the present invention.

FIG. 2B illustrates a block diagram of a computer 250, in accordance with one embodiment of the present invention. The computer 250 may correspond to any of the local computers, computers, or remote servers 120B-130G shown in FIGS. 1B-1G. In one embodiment, the computer is a game console (e.g. Sony PlayStation®, Nintendo Wii®, etc.). Alternatively, the computer may be a network server, a desktop computer, a laptop, a kiosk, etc. In one embodiment, the computer 250 includes a connection system 255, a state logic 260, a process sharing system 265, and a display logic 270. Each of these logics and systems may comprise hardware (e.g., circuitry, dedicated logic, programmable logic, microcode, etc.), software (such as instructions run on a processing device), or a combination thereof.

The connection system 255 manages connections to handheld devices and to other computers. The connection system 255 may receive data from the process sharing system 265, and send the data to connected handheld devices and computers. Data may also be received from the connected handheld devices and computers, and forwarded to the process sharing system 265.

In one embodiment, the process sharing system 265 shares responsibility for running an application between the computer 250 and handheld devices and/or other computers.

The state logic 260 determines a current state for an application executed on the computer 250. The current state may change as connections are established and lost by the connection system 255. The state logic 260 determines a current state based on the individual states of each of the connected devices. Before any handheld devices or computers are connected to computer 250, it may have an initial host state. In one embodiment, the host state is a blank state, meaning that when a handheld device connects to the computer 250, the state of the handheld device is adopted. Alternatively, the host state may be a predetermined state to which the computer 250 has been set. For example, a specific host state of a game may automatically increase character levels of characters within connected handheld devices if they are below a certain level. Upon connection to a handheld device or other computer, state information may be received from that device by the connection system 255, forwarded to the state logic 260, and combined with the host state to generate a hybrid state. The hybrid state may incorporate elements of each of the previous states.

The computer 250 may include a display logic 270 that determines what to display on a local display of the computer 250. A determination of what to show on the local display may be based on a current state determined by the state logic 260, based on properties of the local display (e.g., whether a local display is present, the size of the local display, etc.), and based on information from the connection system 255 detailing what handheld devices and what additional computers are connected to the computer 250. In one embodiment, the determination of what to show on the local display depends on an application being run. In one embodiment, the handheld device type also may have an effect on the local display of the computer 250. For example, if the handheld device has a very small display screen, more of the data may be displayed on the local display of the computer 250. In one embodiment, this data is received from the handheld device via connection system 255. In one embodiment, if computer 250 is hosting multiple handheld devices, the handheld device with the most limitations (i.e. smallest screen, least processing power) may be used to determine the relative split of responsibility for processing and/or display.

Figure 3:
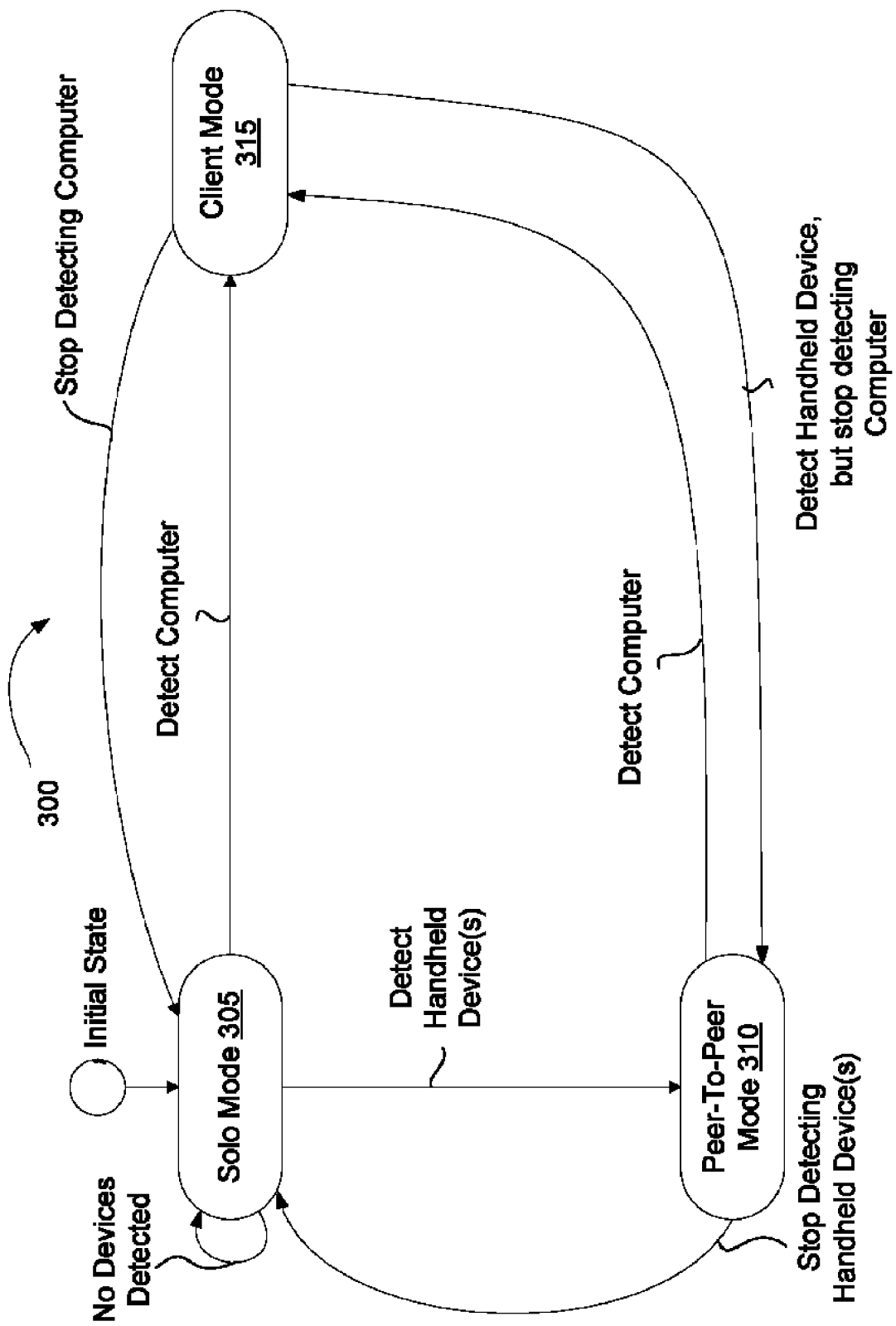
FIG. 3 shows a state diagram for the behavior of a system for sharing execution of applications, in accordance with one embodiment of the present invention.

FIG. 3 shows a state diagram for the behavior 300 of a system for sharing execution of applications, in accordance with one embodiment of the present invention. The system may have multiple operating modes that are navigated between by processing logic that may comprise hardware (e.g., circuitry, dedicated logic, programmable logic, microcode, etc.), software (such as instructions run on a processing device), or a combination thereof. In one embodiment, behavior 300 is the behavior of the handheld device 200 of FIG. 2A.

The behavior 300 may include multiple operating modes for sharing the execution of applications. In one embodiment, only two modes are used: solo mode and component mode. The solo mode is used when there are no connections between devices, while the component mode is used when at least two devices are connected. In an alternative embodiment, multiple different component modes are used. To navigate between modes, certain conditions must be met, as described below.

Referring to FIG. 3, modes in one embodiment include a solo mode 305, a peer-to-peer mode 310, and a client mode 310. In one embodiment, the first mode initiated is the solo mode 305. Alternatively, behavior 300 may be configured to first initiate client mode 315 or peer-to-peer mode 310 if appropriate conditions are satisfied when an application is started up. If no devices are detected, then solo mode 305 is continued.

When one or more handheld devices are detected to which the system (e.g., a handheld device) can connect, peer-to-peer mode 310 may be initiated. In one embodiment, a connection can be established with a handheld device that is running a program that is also being run on the system. In one embodiment, a user may be prompted to select whether to connect to the one or more detected handheld devices. If the prompt is answered in the negative, then solo mode 305 continues. If the instruction to connect to the handheld device(s) is received, then peer-to-peer mode 310 can be initiated. In one embodiment, the system may be configured to automatically connect to available handheld devices. In that instance, the user does not need to be prompted to initiate a connection. Alternatively, the system may be configured to automatically connect only to specified handheld devices.

Peer-to-peer mode 310 may continue so long as a connection is maintained between the system and at least one handheld device. Once connection to handheld devices is lost, solo mode 305 may be initiated. In one embodiment, the system maintains peer-to-peer mode 310 for a predetermined period of time after connection to handheld devices is lost. During this time period, system may try to reconnect with the disconnected handheld devices. If the connection is not reestablished within that time period, solo mode 305 may be initiated.

In one embodiment, if a computer or server is detected, peer-to-peer mode 310 ends, and client mode 315 is initiated. Client mode 315 may be initiated from peer-to-peer mode 310 even when a connection still exists with a handheld device. In such an instance, some or all handheld devices may connect to the computer or server and initiate client mode 315. Alternatively, some handheld devices may remain in peer-to-peer mode (e.g., if a handheld device has an established connection with another handheld device but not with a local computer or remote server).

Client mode 315 may be initiated from solo mode 305 or from peer-to-peer mode 310 when a computer or server is detected. In one embodiment, a user is prompted to log in to the computer (e.g., server, console, kiosk, etc.). If the computer is not logged in to, then the handheld device may remain in solo mode 305 or peer-to-peer mode 310. If the computer is logged in to, then client mode 315 may be initiated. In one embodiment, the computer may automatically be logged in to when it is detected. The system may remain in client mode 315 until a connection to the computer is lost (e.g., the computer is no longer detected, or the user has chosen to log out). If connection to the computer is lost, the system may change to peer-to-peer mode 310 if handheld devices are detected or to solo mode 305 if no handheld devices are detected.

Figure 4:
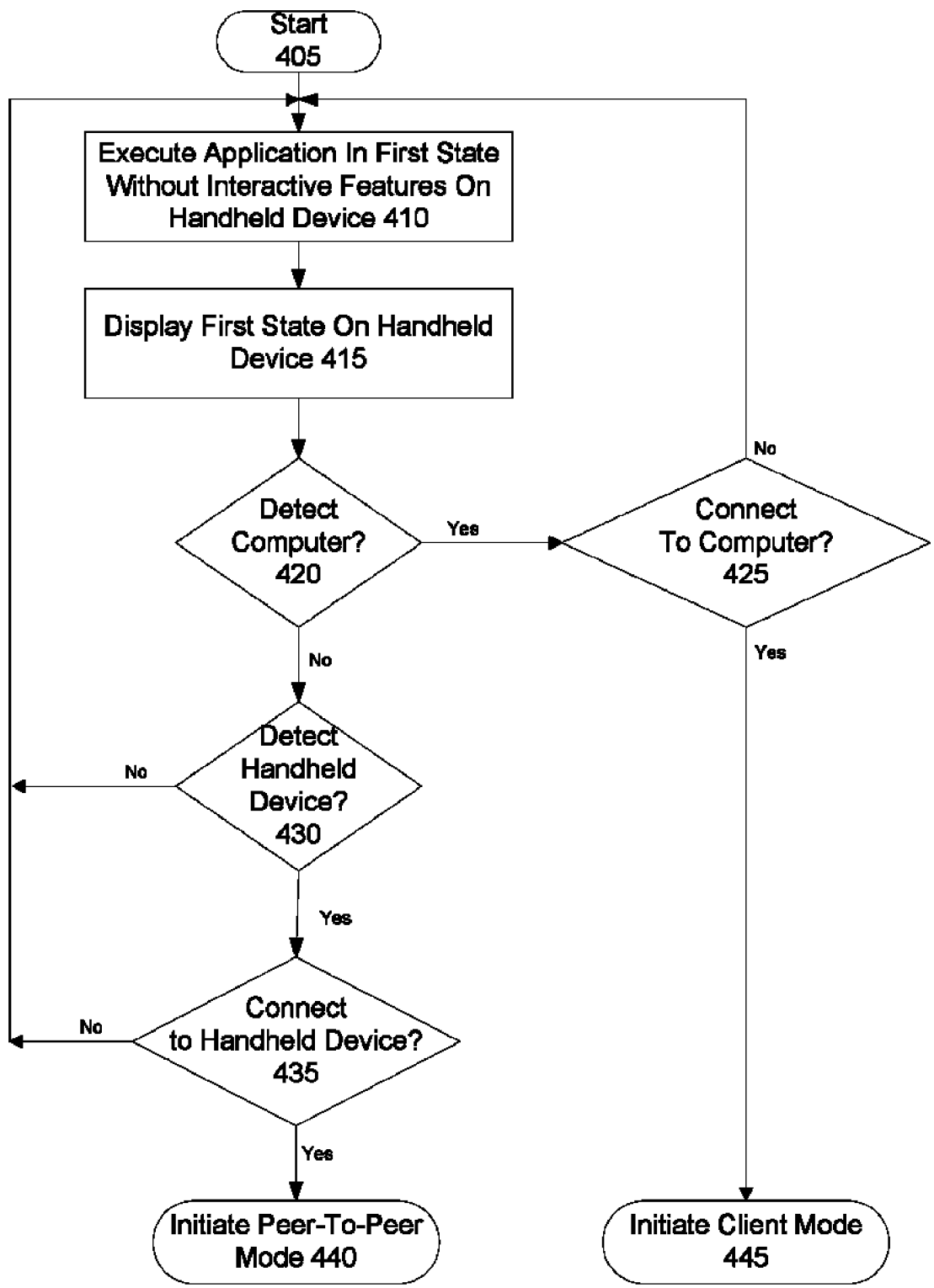
FIG. 4 illustrates a flow diagram for a method of operating a handheld device in solo mode, in accordance with one embodiment of the present invention.

FIG. 4 illustrates a flow diagram for a method of operating a handheld device in solo mode, in accordance with one embodiment of the present invention. In one embodiment, the method corresponds to the solo mode 305 and the transitions from the solo mode 305 of FIG. 3. In one embodiment, the method is started when an application is executed on a handheld device.

The method begins with executing an application in a first state without interactive features on a handheld device (block 410). At block 415, the first state is displayed on the handheld device. At block 420, the method determines whether a computer (e.g., a console, server, personal computer, etc.) is detected. If a computer is detected, the method continues to block 425. If no computer is detected, the method continues to block 430.

At block 425, the method determines whether to connect to the computer. In one embodiment, a user is prompted to indicate whether to connect to the computer. Such a prompt may include a request for login information (e.g., user identification and password), credit card information, etc.). User input may be received indicating whether to initiate a connection, or not to initiate a connection. Alternatively, the connection may be initiated automatically. In one embodiment, the user may set preferences as to how connections are to be established by the handheld device. If the connection is made with the computer, the method proceeds to block 445, and client mode is initiated. If no connection is established, then the method returns to block 410, and continues executing the application in solo mode.

At block 430, the method determines whether a handheld device is detected. If a handheld device is not detected, the method proceeds to block 410, and continues executing the application in solo mode. If a handheld device is detected, the process continues to block 435.

At block 435, the method determines whether to connect to the other handheld device. This determination may be made based on user input, or it may be made automatically. If the handheld devices are not connected to each other, the method returns to block 410. If the handheld devices are connected to each other, the method proceeds to block 440, and peer-to-peer mode is initiated. In one embodiment, both users/handheld devices must accept the connection in order to establish a peer-to-peer mode. In one embodiment, until/unless at least two handheld devices accept the connection, the handheld devices remain in solo mode. In one embodiment, the user may terminate the application, or change from either peer-to-peer or client mode into solo mode at any time.

Figure 5:
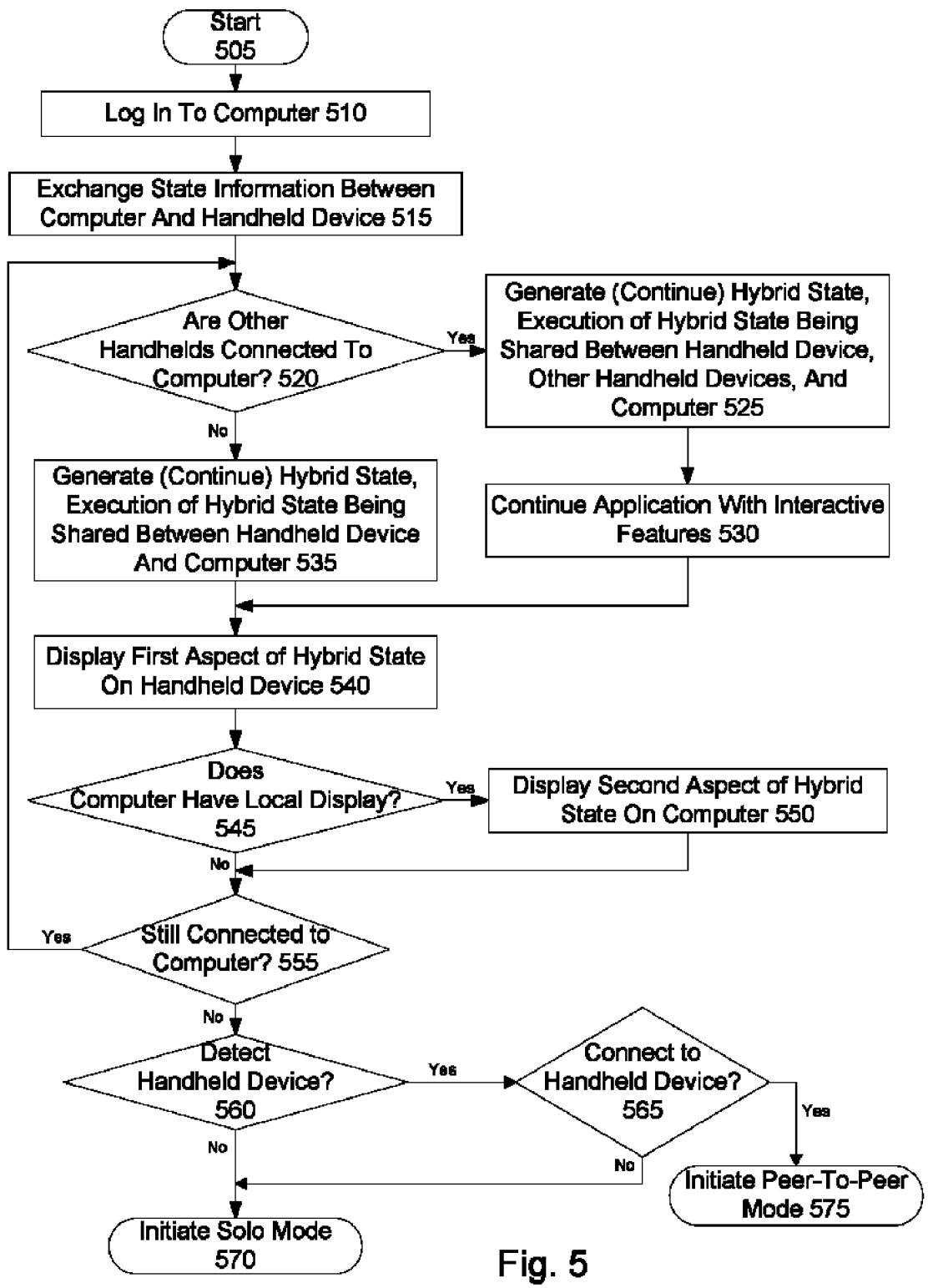
FIG. 5 illustrates a flow diagram for a method of operating a handheld device in client mode, in accordance with one embodiment of the present invention.

FIG. 5 illustrates a flow diagram for a method of operating a handheld device in client mode, in accordance with one embodiment of the present invention. In one embodiment, the method corresponds to the client mode 315 and transitions from the client mode 315 of FIG. 3.

The method begins with logging in to a computer (block 510). At block 515, state information is exchanged between the computer and the handheld device. At block 520, the method determines whether other handheld devices are connected to the computer. If other handheld devices are connected to the computer, the method continues to block 525. If no other handheld devices are connected to the computer, the method continues to block 535.

At block 525, a hybrid state is generated from the combined states of the computer and each of the handheld devices connected to the computer. Execution of the hybrid state is then shared between the handheld devices and the computer. At block 530, the application is continued in the hybrid state with interactive features. The method then proceeds to block 540.

At block 535, a hybrid state is generated from the combined states of the handheld device and the computer. Execution of the hybrid state is then shared between the handheld device and the computer.

At block 540, a first aspect of the hybrid state is displayed on the handheld device. At block 545, the method determines whether the computer has a local display. If the computer does have a local display, the method proceeds to block 550. If the computer does not have a local display, the method proceeds to block 555.

At block 550, a second aspect of the hybrid state is displayed on the local display of the computer. The method then proceeds to block 555.

At block 555, the method determines whether the handheld device is still connected to the computer. If the handheld device is still connected to the computer, then the handheld device continues to run in the hybrid state and the process returns to block 520 to determine if additional handheld devices have connected to the computer. If connection to the computer is terminated the method continues to block 560. Alternatively, if the connection to the computer is lost, a timer may be initiated. If connection to the computer is reestablished before the timer times out, then the process may return to block 520. If the timer times out, then the process may continue to block 560.

At block 560, the method determines whether a handheld device is detected. If a handheld device is detected, the method proceeds to block 565, if no handheld device is detected, the method proceeds to block 570, and solo mode is initiated.

At block 565, the method determines whether to connect to the handheld device. This determination may be made based on user input, or it may be made automatically. If a connection is not established with the handheld device, the method proceeds to block 570, and solo mode is initiated. If a connection is established with the handheld device, the method proceeds to block 575, and peer-to-peer mode is initiated.

Figure 6:
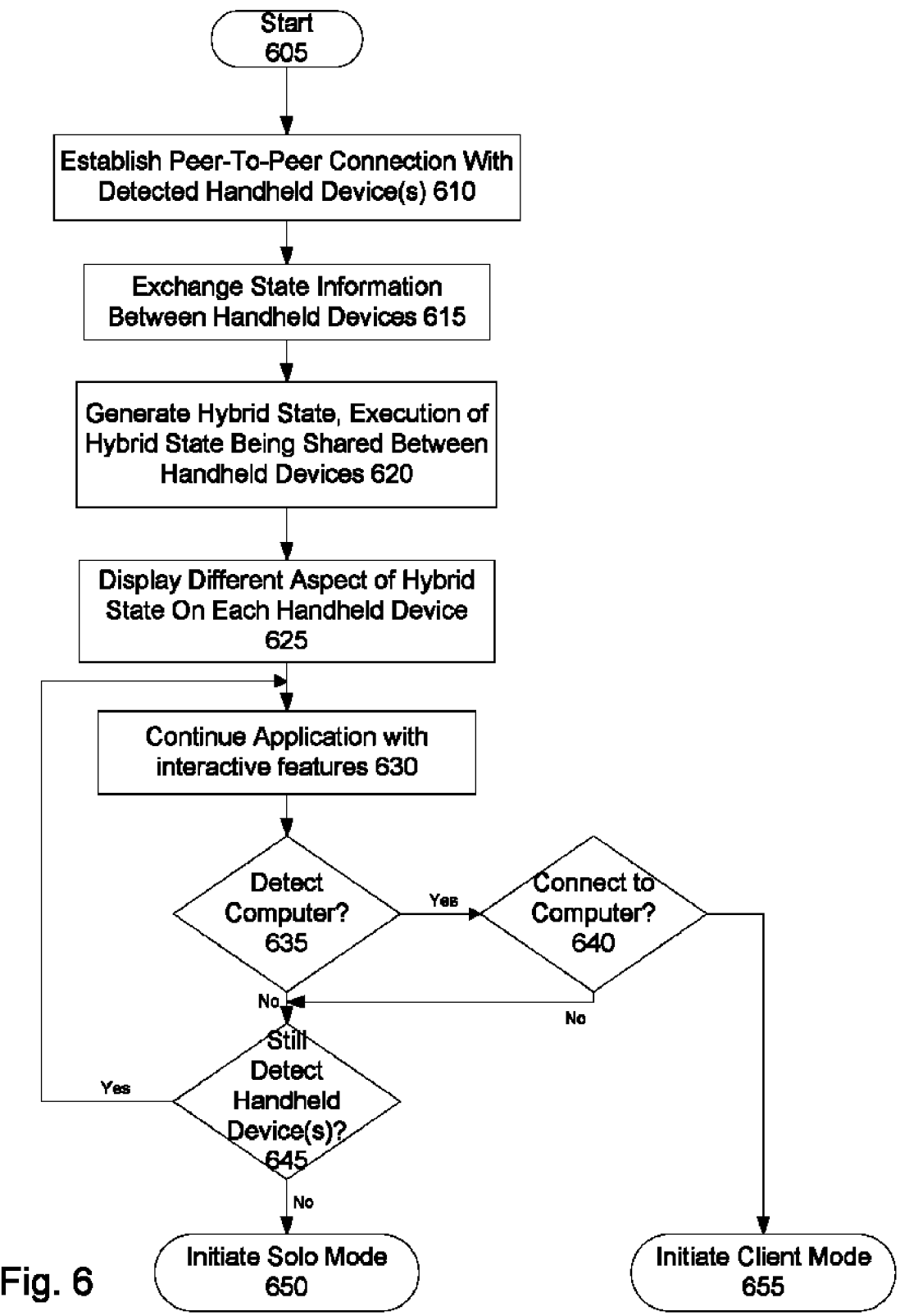
FIG. 6 illustrates a flow diagram for a method of operating a handheld device in peer-to-peer mode, in accordance with one embodiment of the present invention.

FIG. 6 illustrates a flow diagram for a method of operating a handheld device in peer-to-peer mode, in accordance with one embodiment of the present invention. In one embodiment, the method corresponds to the peer-to-peer mode 310 and transitions from and to the peer-to-peer mode 310 of FIG. 3.

The method begins with establishing a peer-to-peer connection between at least two handheld devices (block 610). The peer-to-peer connection may be established automatically upon detection of a handheld device by another handheld device. Alternatively, the connection may be established upon receiving user input to connect to the other handheld device (e.g., after prompting a user whether to establish such a connection). At block 615, state information is exchanged between the handheld devices. At block 620, a hybrid state is generated from the combined states of each of the handheld devices. Execution of the hybrid state is then shared between the handheld devices. At block 625, a different aspect of the hybrid state is displayed on each of the handheld devices. At block 630, the application is continued in the hybrid state with interactive features. The method then proceeds to block 635.

At block 635, the method determines whether a computer is detected. If the computer is detected, then the method proceeds to block 640. If no computer is detected, the method continues to block 645.

At block 640, the method determines whether to connect to the computer. This determination may be made based on user input, or it may be made automatically. If a connection is not established with the computer, the method proceeds to block 645. If a connection is established with the computer, the method proceeds to block 655, and client mode is initiated.

At block 645, the method determines whether a handheld device is still detected. If a handheld device is still detected, the method proceeds to block 630. If no handheld device is detected, the method proceeds to block 650, and solo mode is initiated.

Figure 7:
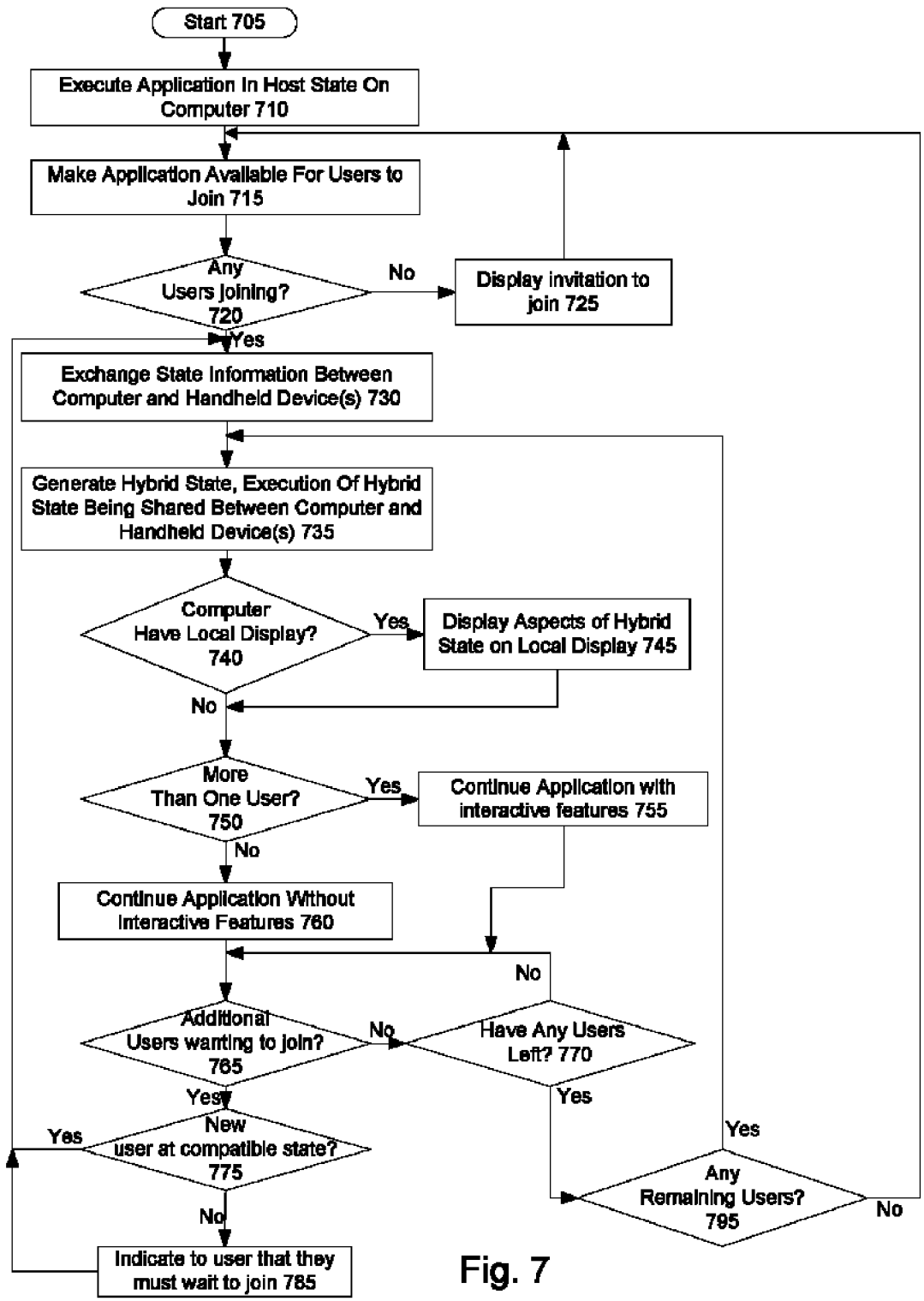
FIG. 7 illustrates a flow diagram for a method of sharing execution of an application between a computer and one or more handheld devices, in accordance with one embodiment of the present invention.

FIG. 7 illustrates a flow diagram for a method of sharing execution of an application between a computer and one or more handheld devices, in accordance with one embodiment of the present invention. The method may be performed by processing logic that may comprise hardware (e.g., circuitry, dedicated logic, programmable logic, microcode, etc.), software (such as instructions run on a processing device), or a combination thereof. In one embodiment, the method may be performed by computer 250 of FIG. 2B.

Referring to FIG. 7, the method begins with executing an application in a host state on a computer (block 710). At block 715, the application is made available for users to join. In one embodiment users may join by logging in to the computer from handheld devices.

At block 720, the method determines whether any users have successfully joined the application. If no users have successfully joined the application, the method proceeds to block 725. If one or more users have joined, the method proceeds to block 730. At block 725, in one embodiment an invitation to join is displayed on a local display of the computer. The method then proceeds to block 715 and again makes the application available for users to join.

At block 730, state information is exchanged between the computer and the handheld device(s). At block 735, a hybrid state is generated from the combined states of each of the handheld devices connected to the computer, and the host state of the computer. Execution of the hybrid state is then shared between the handheld device(s) and the computer.

At block 740, the method determines whether the computer has a local display. If the computer has a local display, then aspects of the hybrid state are displayed on the local display (block 745). The method then proceeds to block 750.

At block 750, the method determines whether more than one user has joined the application. If more than one user has joined, the application is continued in the hybrid state with interactive features (block 755), and the method proceeds to block 765. If only one user has joined, the application is continued in the hybrid state without interactive features (block 760), and the method proceeds to block 765.

At block 765, the method determines whether any additional users have requested permission to join. If no additional users have requested permission to join, the method proceeds to block 770. If additional users have requested permission to join, the method proceeds to block 775.

At block 775, the method determines whether the handheld devices and/or applications running on the handheld devices of the additional user or users who want to join are in a compatible state. Applications may include certain states during which new users cannot join. For example, in a competitive application new users may not be able to join until a new competition is begun. Moreover, applications may include multiple different incompatible versions. If a handheld device of a user has a version of the application that is incompatible with the version being run on the computer, that handheld may not be in a compatible state. For those users wanting to join who are in a compatible state, the method proceeds to block 730. For those users wanting to join who are not in a compatible state, the method proceeds to block 785. At block 785, the users are made to wait until they are in a compatible state. This may include displaying a message on a display of a user's handheld device that the user must wait to join. A state of an application and/or handheld device of a user may become compatible with a state of the application on the computer, for example, when a new competition is begun, or when the handheld device is updated to a compatible version of the application. Such an update may occur automatically or upon receiving user input. For example, in a round based game, a user who wants to join may not be in a compatible state until a current round ends. Once the user is in a compatible state, the method proceeds to block 730.

At block 770, the method determines whether any connections with handheld devices have been terminated (e.g., any users have left). If no connections to handheld devices have been terminated, the method continues to block 765. If one or more connections to handheld devices have been terminated, the method continues to block 795.

At block 795, the method determines whether there are any remaining handheld devices connected to the computer. If there are still handheld devices connected with the computer, then the method proceeds to block 735, and an updated hybrid state is generated. If there are no handheld devices that remain connected to the computer the method proceeds to block 715, and the application is again made available for users to join.

Figure 8:
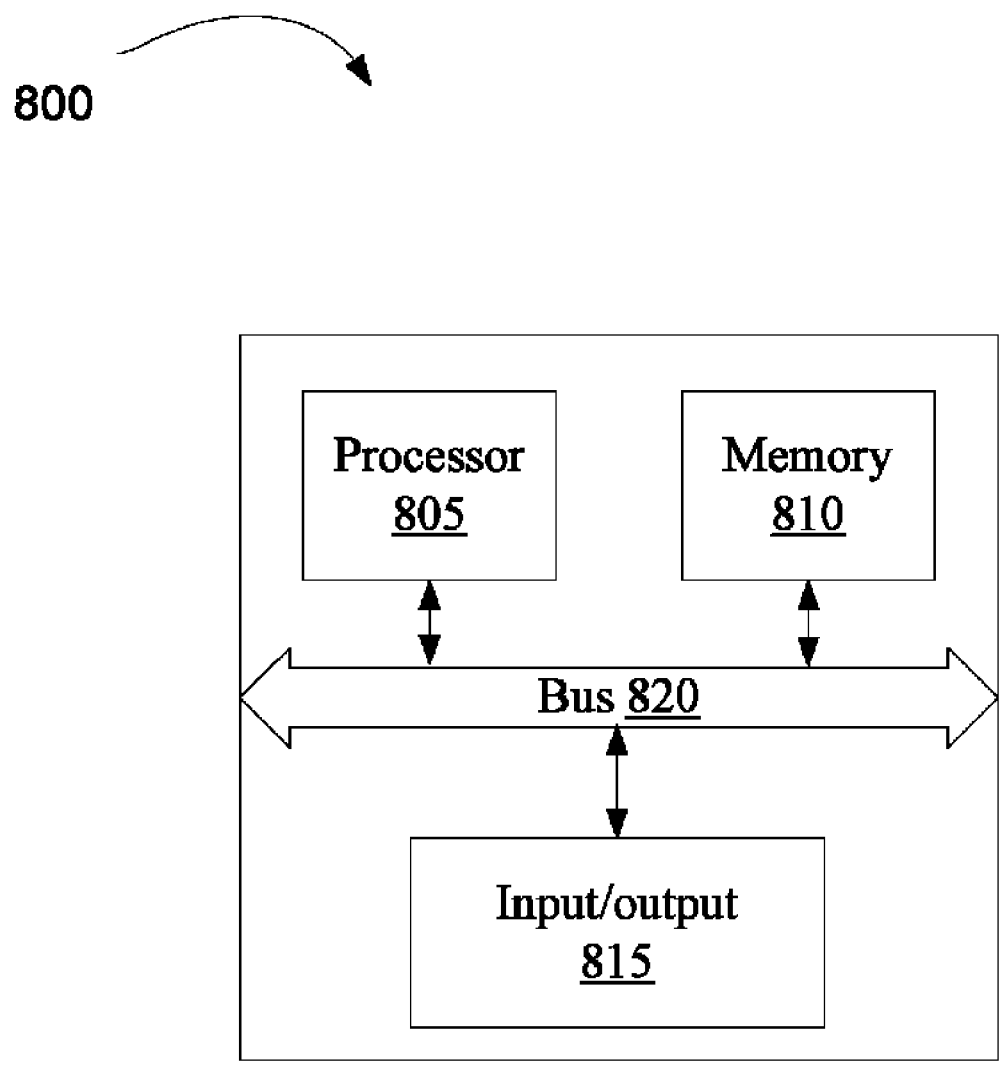
FIG. 8 illustrates a block diagram of a machine in the exemplary form of a computer system, in which embodiments of the present invention may operate.

FIG. 8 illustrates a block diagram of a machine in the exemplary form of a computer system 800 within which a set of instructions, for causing the machine to perform any one or more of the methodologies discussed herein, may be executed. The exemplary computer system 800 includes a processing device (processor) 805, a memory 810 (e.g., read-only memory (ROM), a storage device, a static memory, etc.), and an input/output 815, which communicate with each other via a bus 820. Embodiments of the present invention may be performed by the computer system 800, and/or by additional hardware components (not shown), or may be embodied in machine-executable instructions, which may be used to cause processor 805, when programmed with the instructions, to perform the method described above. Alternatively, the method may be performed by a combination of hardware and software.

Processor 805 represents one or more general-purpose processing devices such as a microprocessor, central processing unit, or the like. More particularly, the processor 805 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 805 may also be one or more special-purpose processing devices such as an application specific integrated circuit (ASIC), a field programmable gate array (FPGA), a digital signal processor (DSP), network processor, or the like.

The present invention may be provided as a computer program product, or software, that may be stored in memory 810. Memory 810 may include a machine-readable medium having stored thereon instructions, which may be used to program exemplary computer system 800 (or other electronic devices) to perform a process according to the present invention. Other machine-readable mediums which may have instructions stored thereon to program exemplary computer system 800 (or other electronic devices) include, but are not limited to, floppy diskettes, optical disks, CD-ROMs, and magneto-optical disks, ROMs, RAMs, EPROMs, EEPROMs, magnetic or optical cards, flash memory, or other type of media or machine-readable mediums suitable for storing electronic instructions.

Input/output 815 may provide communication with additional devices and/or components. In one embodiment, input/output 815 may transmit data to and receive data from, for example, networked computers, servers, mobile devices, etc.

In the foregoing description, numerous specific details have been set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention. The invention has been described with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
   executing an application in a first state on a handheld device;
   connecting the handheld device with an additional device on which the application is executed in a second state;
   combining the first state with the second state of the application being executed on the additional device to generate a hybrid state, execution of the hybrid state being shared between the handheld device and the additional device, wherein the hybrid state incorporates elements of the first state and the second state; and
   displaying a first aspect of the hybrid state on the handheld device.

2. The method of claim 1, further comprising:
   displaying a second aspect of the hybrid state on the additional device.

3. The method of claim 1, wherein executing the application in the first state includes executing the application in a solo mode.

4. The method of claim 1, wherein executing the application in the hybrid state includes executing a portion of the application in a client mode on the handheld device.

5. The method of claim 4, further comprising:
   detecting the additional device, the additional device being at least one of a personal computer, a kiosk, a game console and a server;
   logging in to the additional device; and
   exchanging state information with the additional device.

6. The method of claim 5, wherein a second handheld device is connected to the additional device, the hybrid state including interactive features, and execution of the hybrid state being shared between the first handheld device, the additional device, and the second handheld device.

7. The method of claim 1, wherein executing the application in the hybrid state includes executing a portion of the application in a peer-to-peer mode on the handheld device.

8. The method of claim 7, further comprising:
   detecting the additional device, the additional device being a second handheld device;
   creating a peer-to-peer connection with the additional device; and
   exchanging state information with the additional device.

9. The method of claim 1, wherein the hybrid state includes at least one of application content details, user progress within the application, save file information, and user preferences from each of the first state and the second state.

10. A handheld device capable of multiple modes comprising:
    a motion detection system to detect motion of the handheld device, the motion used to control an application;
    a mode logic running on a processor to place the handheld device in a solo mode when no connection is established with an other device, and to place the handheld device in a component mode when a connection is established with the other device;
    a connection system to enable the handheld device to connect to the other device, the connection to the other device initiating the second mode; and
    a process sharing system to share responsibility for running the application between the handheld device and the other device when the handheld device is in the component mode.

11. The handheld device of claim 10, wherein the component mode is a client mode, and the other device is at least one of a personal computer, a kiosk, a game console and a server.

12. The handheld device of claim 10, wherein the component mode is a peer-to-peer mode, and the other device is an additional handheld device.

13. The handheld device of claim 10, wherein the responsibility of the handheld device when the responsibility is shared is to provide input signals from the user.

14. The handheld device of claim 10, wherein the responsibility of the handheld device when the responsibility is shared is to execute at least a portion of a hybrid state of the application, the hybrid state combining a first state of the application previously run on the handheld device and a second state of the application previously run on the other device.

15. The handheld device of claim 10, wherein the connection system is further configured to send data packets to the other device to determine a relative distance from the other device.

16. A non-transitory computer readable medium including instructions that, when executed by a processing system, cause the processing system to perform a method comprising:
    executing an application in a first state on a processor on a handheld device;
    connecting the handheld device with an additional device including a processor on which the application is executed in a second state;
    combining the first state with the second state of the application being executed on the additional device to generate a hybrid state, execution of the hybrid state being shared between the handheld device and the additional device, wherein the hybrid state incorporates elements of the first state and the second state; and
    displaying a first aspect of the hybrid state on a screen on the handheld device.

17. The computer readable medium of claim 16, the method further comprising:
    displaying a second aspect of the hybrid state on the additional device.

18. The computer readable medium of claim 16, wherein executing the application in the first state includes executing the application in a solo mode.

19. The computer readable medium of claim 16, wherein executing the application in the hybrid state includes executing a portion of the application in a client mode on the handheld device, the method further comprising:
    detecting the additional device, the additional device being at least one of a personal computer, a kiosk, a game console and a server;
    logging in to the additional device; and
    exchanging state information with the additional device.

20. The computer readable medium of claim 16, wherein executing the application in the hybrid state includes executing a portion of the application in a peer-to-peer mode on the handheld device, the method further comprising:
    detecting the additional device, the additional device being a second handheld device;
    creating a peer-to-peer connection with the additional device; and
    exchanging state information with the additional device.

21. A method, comprising:

executing an application in a solo mode and in a first state on a handheld device, wherein the handheld device acts as an autonomous system while the application is executed in the solo mode;

connecting the handheld device with an additional device on which the application is executed in a second state;

transitioning from the solo mode to a component mode on the handheld device, wherein the handheld device acts as a component of a multi-device system while the application is executed in the component mode;

combining the first state with the second state to generate a hybrid state, execution of the hybrid state being shared between the handheld device and the additional device, wherein the hybrid state incorporates elements of the first state and the second state; and displaying a first aspect of the hybrid state on the handheld device.

22. The method of claim 21, wherein the handheld device acts as an input device for the multi-device system while the application is executed in the component mode.

\* \* \* \* \*